United States Patent
Jäntti et al.

(12) 
(10) Patent No.: US 6,317,423 B1
(45) Date of Patent: Nov. 13, 2001

(54) METHOD FOR CONTROLLING A BASE STATION, AND BASE STATION

(75) Inventors: Arto Jäntti; Jukka Peltola, both of Oulu (FI)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/142,001

(22) PCT Filed: Feb. 28, 1997

(86) PCT No.: PCT/FI97/00135

§ 371 Date: Aug. 28, 1998

§ 102(e) Date: Aug. 28, 1998

(87) PCT Pub. No.: WO97/32406

PCT Pub. Date: Sep. 4, 1997

(30) Foreign Application Priority Data

Mar. 1, 1996 (FI) .................................................. 960987

(51) Int. Cl.[7] .................................................. H04B 7/212
(52) U.S. Cl. .................................................. 370/347
(58) Field of Search .................................. 370/347, 321, 370/468, 474, 337, 350; 455/33.1; 379/59

(56) References Cited

U.S. PATENT DOCUMENTS

| | | | | |
|---|---|---|---|---|
| 5,260,944 | * | 11/1993 | Tomabechi | 370/95.1 |
| 5,446,739 | * | 8/1995 | Nakano et al. | 370/85.3 |
| 5,475,864 | * | 12/1995 | Hamabe | 455/33.1 |
| 5,586,170 | * | 12/1996 | Lea | 370/60 |
| 5,818,829 | * | 10/1998 | Raith et al. | 370/347 |

FOREIGN PATENT DOCUMENTS

| | | |
|---|---|---|
| 44 32 928 | 3/1996 | (DE) . |
| 0 399 206 | 11/1990 | (EP) . |
| 0 444 592 | 9/1991 | (EP) . |
| 0 654 952 | 5/1995 | (EP) . |
| 2 217 955 | 11/1989 | (GB) . |
| 470 078 | 11/1993 | (SE) . |
| 91/01073 | 1/1991 | (WO) . |
| 95/32591 | 11/1995 | (WO) . |

* cited by examiner

Primary Examiner—Huy D. Vu
Assistant Examiner—Alexander O. Boakye
(74) Attorney, Agent, or Firm—Pillsbury Winthrop LLP

(57) ABSTRACT

A method for controlling a base station (100, 200), used in a cellular radio system employing a TDMA multiple access method and having terminals (41–45), sectors (51–55) and at least one base station (100, 200) which transmits one or more carriers, and which has a number of baseband parts (16, 25), and at least one transmitter/receiver unit (12, 22), and which is connected to the rest of the system by a digital transmission line (70) in which information is transmitted in timeslots. The timeslots are allocated as required to different carriers, the baseband parts (16, 25) are allocated as required to different sectors (51–55) and the timeslots are allocated to different carriers so that one carrier will have no more than 16 timeslots.

14 Claims, 5 Drawing Sheets

METHOD FOR CONTROLLING A BASE STATION, AND BASE STATION

BACKGROUND OF THE INVENTION

The present invention relates to a method for controlling a base station, used in a cellular radio system employing TDMA multiple access method and comprising terminals, sectors and at least one base station which transmits one or more carriers, and which comprises a number of baseband parts, and at least one transmitter/receiver unit, and which is connected to the rest of the system by a digital transmission line in which information is transmitted in timeslots.

Prior art knows a Base Transceiver Station (i.e. BTS) of a cellular radio system, which transmits data to the radio path and which receives data from the radio path. The data stream received from the transmission path at the base station has been divided into frames that comprise timeslots. The timeslots comprise, in digital form, data contained by the different channels. The data in the timeslots of the frame have been processed in a suitable way at the base station, and the processed data have been allocated via the base station sections to subscriber terminals located in different parts in a sector of a cell in the cellular radio system. In the known solutions, channel allocation to different carriers and sectors has been determined by fixed timeslot allocation settings.

It has not, however, been easy to change the allocation settings of channels received at the base station because the allocation settings have been fixed. As a consequence of the difficult changing of the allocation settings, it has not been possible to utilize the transmission path capacity efficiently or flexibly enough. What was set forth above means that the data equipments on the transmission path have not met quickly or efficiently enough the requirements of other equipments using the transmission path. Allocation of channels into different sectors in the prior art required changing the allocation settings of transmission equipments in the base station, which was difficult and slow because the settings had to be changed manually. It was necessary to allocate timeslots from the transmission equipments even though the base station at that moment was not able to utilize the allocated timeslots. The costs have been added to by the requirement to allocate a lot of capacity in a base station in order to take into account that the network is at times loaded heavily and unevenly. It has, however, proved to be difficult to change the channel configuration of the network so that the network would operate flexibly under all loads.

BRIEF SUMMARY OF THE INVENTION

It is consequently the object of the present invention to provide a method by means of which the allocation of channels originating from the transmission direction may be allocated to the radio path as flexibly and efficiently as possible.

This object is achieved by means of a method of the type set, forth in the introduction, characterized in that timeslots are allocated as required to different carriers, and that the baseband parts are allocated as required to the different sectors.

The invention further relates to a base station used in a cellular radio system employing TDMA multiple access method and comprising terminals, sectors, a transmission line and at least one base station Which transmits one or more carriers, and which comprises a number of baseband parts, and at least one transmitter/receiver unit, and which is connected to the rest of the system by a digital transmission line in which information is transmitted in timeslots.

The receiver according to the invention is characterized by comprising control means for allocating the timeslots as required to different carriers, and for allocating the baseband parts to different sectors.

With the method according to the invention, reconfiguration of channel allocation settings, related to the known methods, may be avoided. In the method, the base station assigns the channels received in timeslots at the base station in its transmission block, i.e. allocation means, to any of the carriers transmitted by the base station. This results in that the method according to the invention contributes to a cellular radio network, particularly a GSM network, becoming more flexible and easier to maintain.

The base station according to the invention also has a number of advantages. The base station assigns timeslots received at the allocation means of the base station to those sectors in which capacity at any one time is needed. The baseband parts of the base station may be divided among the different sectors of the base station. The radio frequency block, of the We station, i.e. the transmitter/receiver unit, is capable of handling several carriers. In this manner, the number of parts in the base station may be reduced, which consequently decreases the costs of constructing a network. The base station controls the timeslot settings of the allocation means to be on and off so that a timeslot becoming free may be used by other terminals seeking to have a connection. The solution according to the invention does not involve fixed allocation settings for the timeslots but the allocation settings are changed dynamically.

BRIEF DESCRIPTION OF THE SEVERAL VIEWS OF THE DRAWING

In the following, the invention will be described in more detail with reference to the examples in the accompanying drawings, in which.

DETAILED DESCRIPTION OF THE INVENTION

Figure 1:
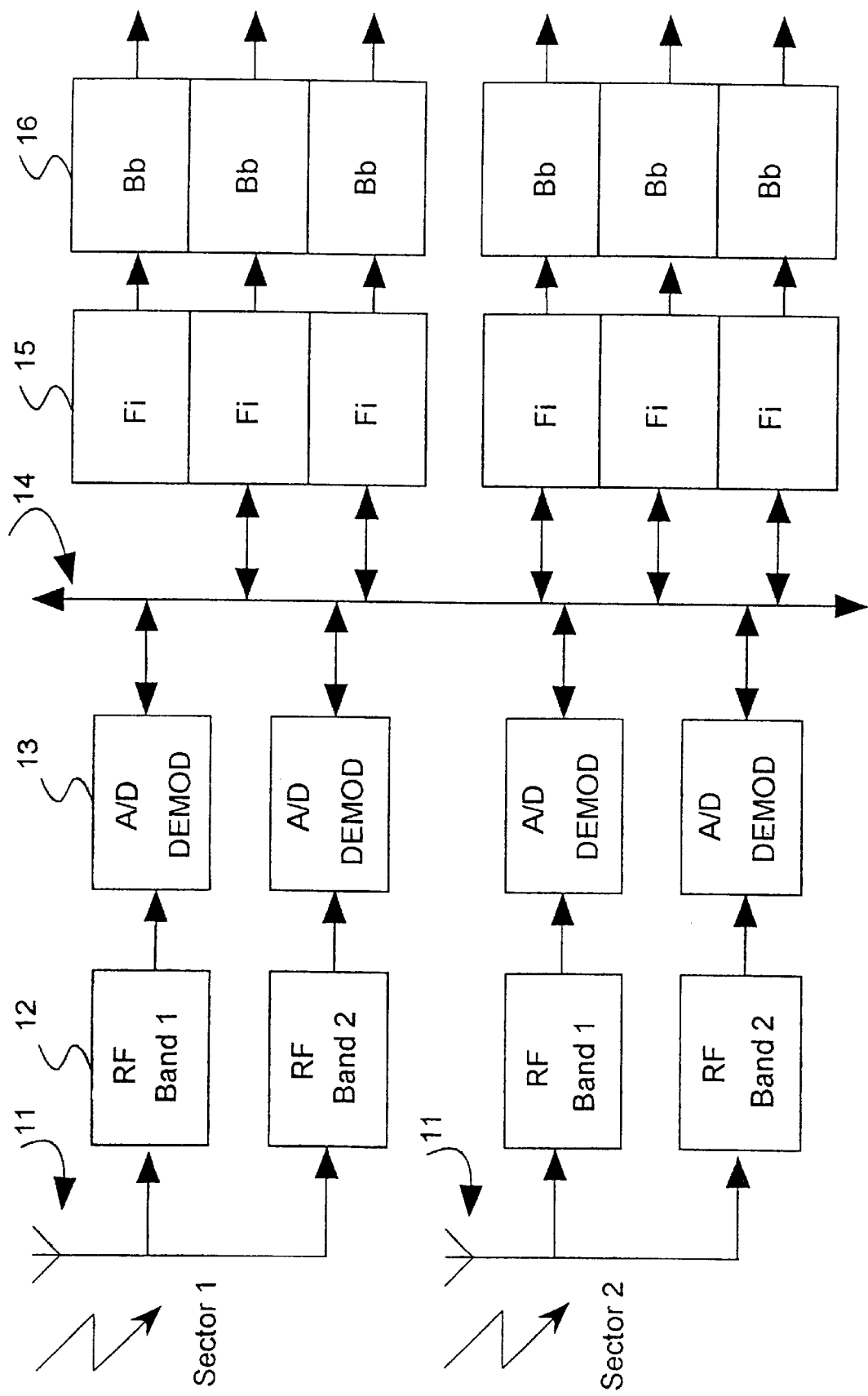
FIG. 1 illustrates the structure of the RX side of the base station according to the invention.

FIG. 1 shows the receiving, i.e. RX, side of the base station of the cellular radio network. The receiving side consists of an antenna 11, a group of transmitter/receiver units, i.e. RF units 12, and combined AID converter and demodulator parts 13. The receiving side further comprises a first data bus 14 as well as filter parts 15 and baseband parts 16. In the case according to the figure, the signal received from the radio path at the antenna 11 of the base station is connected via the transmitter/receiver unit 12 to the combined AID converter and modulator parts 13. The AID converter and, modulator parts 13 are connected via the first data bus 14 to the filter parts 15 which are connected to the baseband parts 16.

The radio frequency signal received from the radio path by the base station of the cellular radio network first arrives at the antenna 11 comprised by the base station. The cellular radio network consists of a number of cells that are possibly divided into different sectors. The terminals located in the sectors are within the coverage area of the base station transmitting to the sector. In the solution of the figure, the base station antennas 11 receive a signal from different sectors. If terminals located within the same sector have a plurality of connections to other terminals, the base station antenna 11 handles a number of different carriers. The figure shows that the signal received by the antenna 11 is supplied in an antenna cable to the transmitter/receiver unit 12 in which an intermediate frequency signal, i.e. an IF signal, is formed from the signal. The IF signal comprises data comprised by a number of different channels. The signal formed in the transmitter/receiver unit 12 is applied further to the AND converter and demodulator parts 13 in which the incoming analog signal is demodulated and converted into digital form. The digital signal obtained is applied via the first data bus 14 to the channel-selective filter parts 15 in which disadvantageous features are filtered off from the digital signal. Following this, the filtered signal is applied to the baseband parts 16 which performs various kinds of processings, such as decoding, for the signal.

Figure 2:
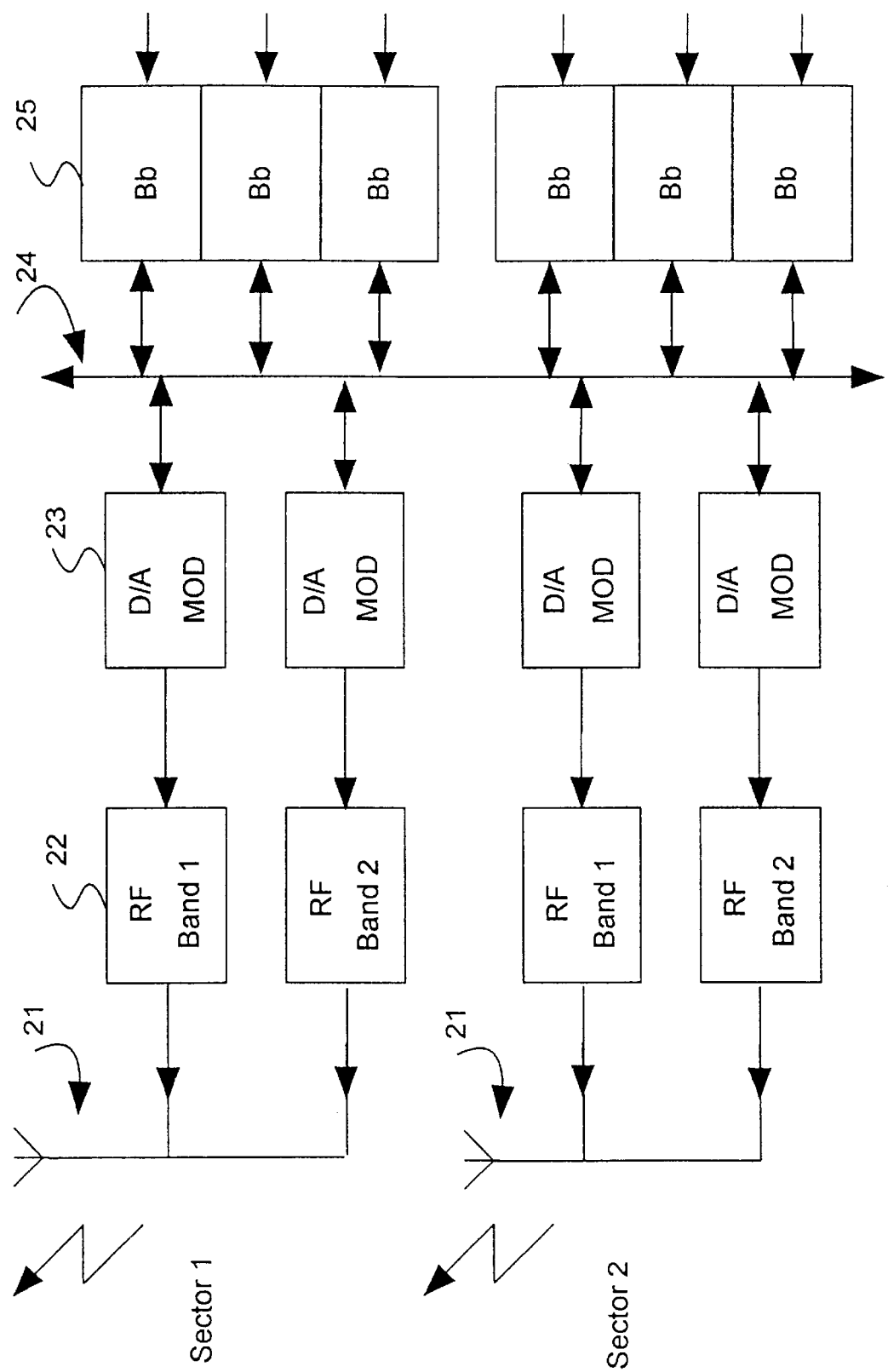
FIG. 2 illustrates the structure of the TX side of the base station according to the invention.

FIG. 2 shows the transmitting side, i.e. the TX side, of the base station in the cellular radio system. The transmitting side comprises an antenna 21, transmitter/receiver units 22, D/A converter and modulator parts 23, a first data bus 24 and baseband parts 25. The signal is connected to the transmitting side of the base station according to the figure first into the baseband parts 25 from which the signal is connected via the first data bus 24 to the combined D/A converter and modulator parts 23. From the D/A converter and modulator parts 23 the signal is fed to the transmitter/receiver unit 22 and further, in an antenna cable, to the antenna 21 from which the signal is transmitted on the radio path further to the terminals in the sector. In the solution according to the invention, the base station comprises two antennas 21, both transmitting a signal to their respective sectors.

In the baseband parts 25 of the transmitting side of a base station in a cellular radio network according to FIG. 2, various kinds of processings are performed for the signal, including coding, multiplexing, and framing. The signal processed in the baseband parts 25 is supplied to the first data bus 24 from which it is connected to the D/A converter and modulator parts 23. The D/A converter and modulator parts 23 choose, from the first data bus 24, a signal to be D/A converted and modulated. The analog signal received by the transmitter/receiver unit 22 from the D/A converter and modulator parts 23 comprises several modulated frequencies, that is, the signal contains data comprised by a number of channels. The signal is amplified in the transmitter/receiver parts 22, and the signal is fed in an antenna cable to the antenna 21 which transmits it to the radio path. The first data bus 24 enables the signal received from the baseband parts 23 to be sent to the radio path via any transmitter/receiver unit 22 of the base station. The signal transmitted to the radio path is received by a terminal located in a sector of a cell of the cellular radio network.

Figure 3:
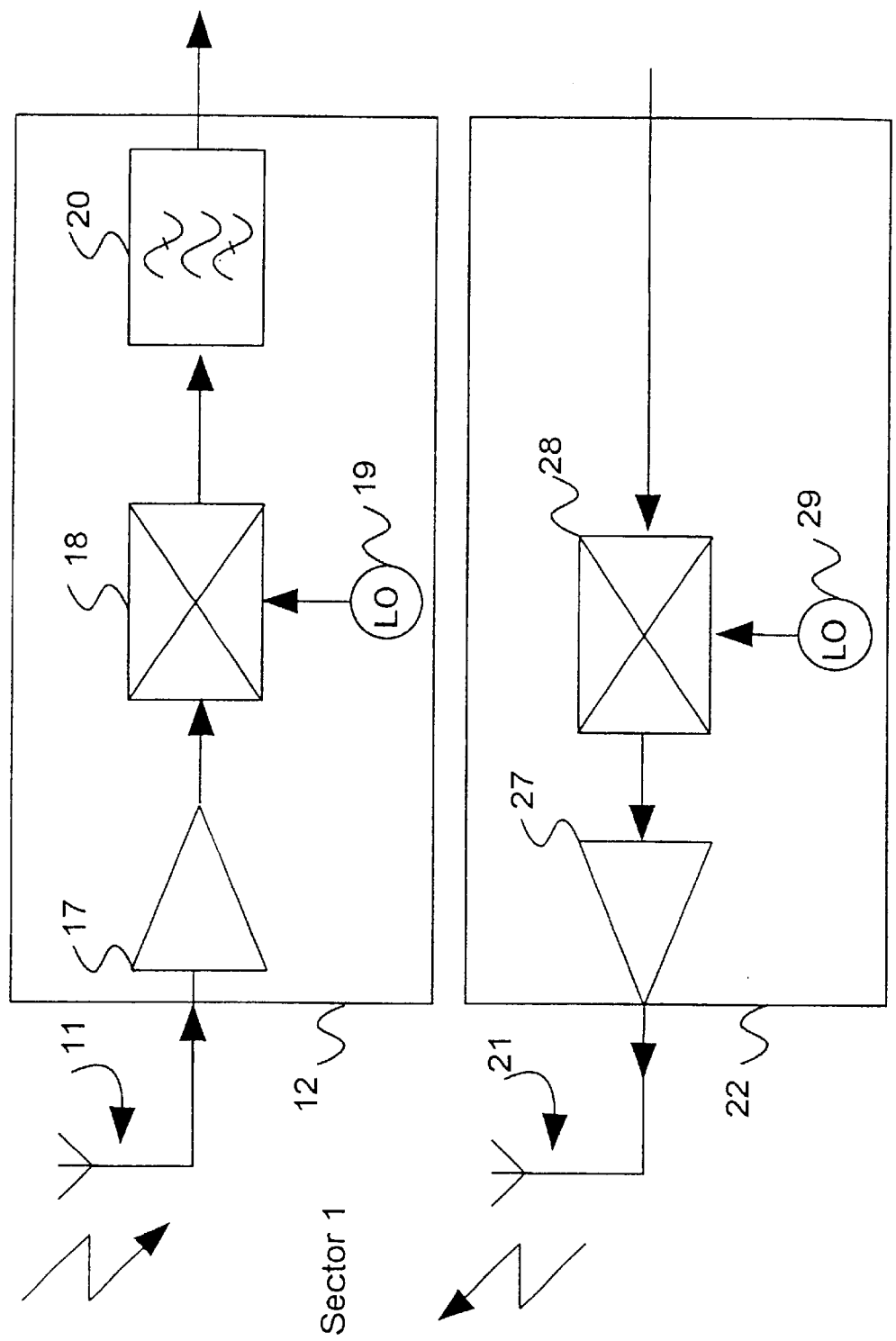
FIG. 3 illustrates the structure of the transmitter/receiver unit of the base station according to the invention.

FIG. 3 illustrates the internal structure of the transmitter/receiver unit 12, 22 of the base station. The transmitter/receiver unit 12 comprises, in the receiving direction, an RX amplifier 17, a local oscillator 19, a mixer 18 controlled by the local oscillator 19 and a passband filter 20. In the receiving direction, the signal received from the antenna 11 is applied to the amplifier 17 in which the signal that has been attenuated on the radio path and in the antenna cable is amplified. The local oscillator 19 is connected to control the mixer 18. The mixer ;18 is used for shaping the signal received from the RX amplifier 17. The shaped signal is fed from the mixer 18 further to the passband filter 19 in which the signal is filtered. In the filtering, e.g. signals which are off the receiving band and which do not contain any important information are removed from the signal. The filtered signal that is to be applied further to the A/D converter 13 is referred to as an intermediate frequency signal, i.e. IF signal. The IF signal is a wideband signal, and it contains several channels channelled by the Time Domain Multiple Access (TDMA) method.

The transmitting direction of the transmitter/receiver 22 comprises a TX amplifier 27, a local oscillator 29 and a mixer 28. An analog signal containing a number of different frequencies is applied, in the transmission direction, from the modulator and D/A converter 23 to the transmitter/receiver Unit 22. The signal is applied to the mixer 28 controlled by the local oscillator 29, in which the signal is used for modulating the carrier. The signal obtained from the mixer 28 is further applied to the TX amplifier 27 in which the signal is amplified. The amplified signal is then applied in an antenna cable to the antenna 21 and further to be transmitted to a terminal located in a sector of a cell in the cellular radio network. The transmitter/receiver unit 22 is capable of handling several carriers.

Figure 4:
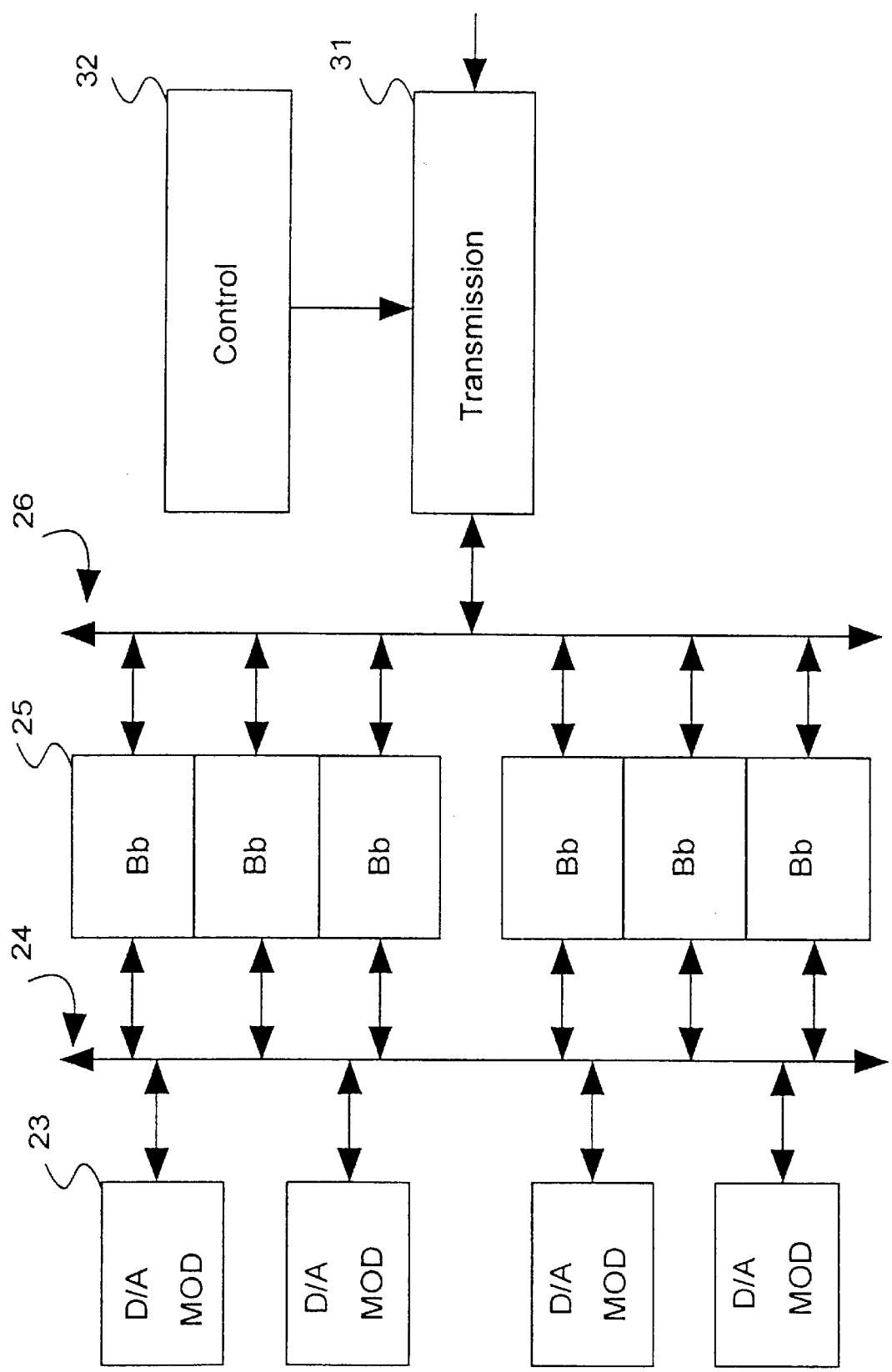
FIG. 4 illustrates how the allocation means and control means of the base station according to the invention are connected to the base station.

FIG. 4 shows a block diagram of a base station comprising a first data bus 24, and D/A converter and modulator parts 23 as well as baseband parts 25 connected via it. In addition, the base station comprises a second data bus 26 and allocation means 31 connected via it to the baseband parts 25. In the base station solution set forth, one set of baseband parts 25 is able to handle channels comprised in one carrier, of which there are usually eight. A carrier may also have more channels. For example, if the base station operates in a half rate mode the carrier transmitted may have 16 channels. The allocation means 31 according to the figure receive signals e.g. from a PSTN network (Public Service Telephone Network) which utilizes e.g. PCM technique (PCM=Pulse Code Modulation). The input signals to the allocation means 31 may also originate e.g. from a Base Station Controller (i.e. BSC).

In the block diagram set forth, the baseband parts 25 constitute a pool, i.e. a group in which the channels passing through the baseband parts 25 may be connected freely to any sector of the base station. In this manner it is possible to reduce the number of parts in the base station, which results in lower costs. What was described above means that the base station employs an efficient joint use of radio channels. In joint use of channels, not all the channels of the different sectors are used simultaneously. This means that the capacity of the channels may easily be divided among a plurality of users. In the solution according to the invention, the transmitter/receiver unit 22 handles a number of carriers, which makes further simplifications possible in the base station structure, particularly if the method of the invention for allocating timeslots is in use. In the preferred case, the sector needs just one transmitter/receiver unit 22 which handles all the carriers to be transmitted to the sector.

In the solution according to FIG. 4, the base station controls the channel allocation taking place in the allocation means 31. The base station a comprises control means 32 for assigning the channels received at the allocation means 31 to different carriers. As the solution according to the invention enables the base station to define an advantageous position at any one time for the timeslots in the carrier to be transmitted, a most flexible base station solution may be obtained. There is no need for predetermined allocation settings, as the allocation means 31, controlled by the control means 32 of the base station, allocate the channels to the correct sectors. Thus, the timeslots, or channels therein, received by the baseband parts 25 of the base station may be arranged freely to any carrier or sector.

Figure 5:
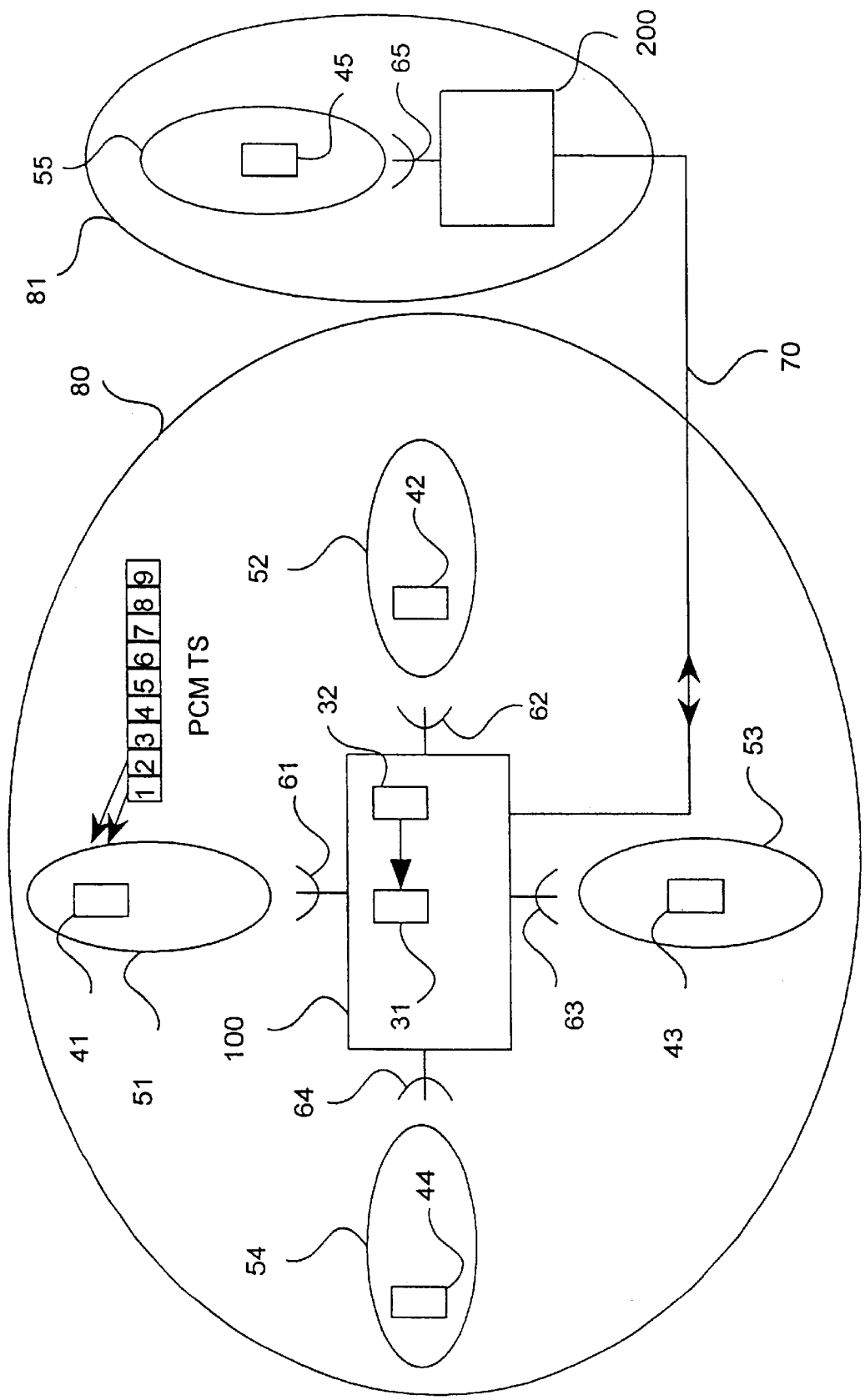
FIG. 5 illustrates the structure of the cellular radio network according to the invention.

FIG. 5 shows a cellular radio network comprising two cells, 80 and 81. The cell 80 comprises a base station 100. The cell 80 has been divided into four sectors 51–54. In the case illustrated by the figure, the base station 100 comprises four antennas 61–64, each directed towards their respective sectors 51–54. The sectors 51–54 constitute the coverage area for the base station 100 In the solution of the figure, the sectors 51–54 comprise a group of terminals 41–44 within their area. In addition, the base station 100 comprises control means 32 and allocation means 31.

The cell 81 also comprises a base station 200. Instead, the base station 200 only comprises one antenna 65 directed towards the sector 55. The sector 55 also contains a group of terminals 45 within the coverage area of the base station 200. The base station I 00 and the base station 200 are interconnected e.g. by a PSTN network 70. A signal 70 received by the allocation means 31 of the base station 100, 200 may also originate e.g. from the base station controller.

The base station 100 of the cellular radio network illustrated in FIG. 5 utilizes the solution according to the invention. The antennas 61–64 comprised by the base station 100 each transmit and receive a signal from their respective sectors 51–54. To each antenna 61–64 of the base station 100, transmitter/receiver units 12, 22 comprised by the base station 100 have been connected which are used for transmitting and receiving carriers. The cellular radio network additionally comprises in each sector 51–54, i.e. within the coverage area of the base station, terminals 41–44 the number of which is not stable but varies with time. The terminals 41–44 communicate via the base station 100 with the terminals 45 located e.g. in the sector 55 of the cell 81.

To facilitate understanding the point, it is assumed that in the solution according to FIG. 5 there are at first eight terminals 41–44 in each sector 51–54 of the cell 80, the terminals communicating e.g. with terminals 45 that are in the sector 55 of the cell 81. In the base station 100 according to the figure, each transmitter/receiver unit 12, 22 at first only transmits one carrier to each sector 51–54, whereby the carriers being transmitted have no capacity left to transmit more channels. The control means 32 in the base station 100 control the timeslot settings of the allocation means 31 so that the base station 100 assigns the terminals 41–44 in the sectors 51–54 with more timeslots to use if the need arises. If additional capacity is required, the control means 32 also instruct the base station 100 to take in use a sufficient number of carriers in which the channels required by the additional capacity may be transmitted. If the terminals 41–44 in the sectors 51–54 cut off their connections the allocation means 31 in the base station 100 release, under control of the control means 32, the timeslots earlier temporarily allocated for the duration of the connection by e.g. the terminals 41–44. At the same time, transmission of carriers not required any longer is discontinued. Hence, the allocation means 31 have no fixed timeslot settings. Upon changes in the number of connections by terminals 41–44 that are in the coverage area of the base station 100, i.e. in sectors 51–54, the base station 100 is informed of the changed situation and, by employing the control means 32, the base station 100 controls the allocation means 31 according to the changed situation.

Referring to FIG. 5 it is further assumed that there are eight terminals 41 in the sector 51 of the cellular radio network, communicating with the terminals 45 in the coverage area 55 of the base station 200. The terminals 41 within the sector 51 use timeslots TS1–TS8 (TS=Time Slot) in the signal 70 to the base station. Each timeslot is able to carry one channel between terminals 41 in the sector 51 and terminals 45 in the sector 55. When one of the terminals 41 cuts off a connection, the allocation means 31 release controlled by the control means 32, the timeslot settings of the terminal 41 in question. If all the terminals 41 within the cell 51 area cut off their connections, the timeslots TS1–TS8 may again be reserved by the terminals 41–44 in the sectors 51–54. If, for example, the carrier transmitted to the sector 52 has all its channels in use, the sector 52 may, controlled by the control means 32 of the base station 100, have more carriers to use in which the channels may be sent forward e.g. in the timeslots TS1–TS8 that were released above. Therefore, fixed and inflexible timeslot setting can be avoided. By the solution according to the invention, the network will not be blocked even in case of great changes in the load.

Although the invention is in the above described with reference to the example in the accompanying drawings, it is obvious that the invention is not restricted thereto but may be modified in many ways within the inventive idea of the attached claims.

What is claimed is:

1. A method for controlling abase station used in a cellular radio system employing TDMA multiple access techniques and including terminals, sectors and at least one base station which transmits one or more carriers, wherein the base station includes a plurality of baseband parts, and at least one transceiver unit, which is coupled to the rest of the system by a digital transmission line configured to transmit information in the timeslots, the method comprising: dynamically allocating the timeslots as required to different carriers, dynamically allocating the baseband parts as required to different sectors, wherein a timeslot dynamically allocated to a carrier passes through a dynamically allocated baseband part, and wherein the dynamically allocated baseband part through which the timeslot passes may be freely associated with different sectors.

2. The method of claim 1, wherein one transceiver unit handles a plurality of carriers.

3. The method of claim 1, wherein one transceiver unit handles all the carriers sent to the same sector.

4. The method of claim 1, wherein the timeslots are allocated to different carriers so that one carrier will have no more than 16 timeslots.

5. A method for controlling a base station used in a cellular radio system employing TDMA multiple access method and comprising terminals, and at least one base station which transmits one or more carriers, and which comprises a number of baseband parts, and at least one transmitter/receiver unit, and which is connected to the rest of the system by a digital transmission line in which information is transmitted in timeslots, the method comprising: the timeslots are allocated as required to different carriers, the baseband parts are allocated as required to different sectors, and the baseband parts are allocated so that timeslots routed via the same baseband part are transmitted to different sectors.

6. A base station used in a cellular radio system employing TDMA multiple access techniques and including terminals, sectors, a digital transmission line, and at least one base station which transmits one or more carriers, the base station including a plurality of baseband parts, and least one transceiver, which is coupled to the rest of the system by the digital transmission line configured to transmit information in timeslots, the base station comprising: control means for dynamically allocating the timeslots as required to different carriers, and for dynamically allocating the baseband parts to the different sectors, wherein a timeslot dynamically allocated to a carrier passes through a dynamically allocated baseband part, and wherein the dynamically allocated baseband part through which the timeslot passes may be freely associated with different sectors.

7. The base station of claim 6, wherein the transceiver unit is arranged to handle a plurality of carriers.

8. The base station of claim 6, wherein the transceiver unit is arranged to handle all the channels transmitted in one carrier.

9. The base station of claim 6, wherein the control means control the allocation of timeslots to different carriers so that one carrier will contain no more than 16 timeslots.

10. A base station used in a cellular radio system employing TDMA multiple access method and including terminals, sectors, a transmission line and at least one base station which transmits one or more carriers, and which comprises a number of baseband parts, and at least one transmitter-receiver, which is connected to the rest of the system by a digital transmission line in which information is transmitted in timeslots, the base station comprising: control means for allocating the timeslots as required to different carriers, and for allocating the baseband parts to different sectors, and wherein the baseband parts are arranged to be allocated so that timeslots routed via the same baseband part are transmitted to the different sectors.

11. A base station used in a cellular radio system employing TDMA multiple access method and comprising terminals, sectors, a transmission line and at least one base station which transmits one or more carriers, and which comprises a number of baseband parts, and at least one transmitter-receiver, which is connected to the rest of the system by a digital transmission line in which information is transmitted in timeslots, the base station comprising: control means for allocating the timeslots as required to different carriers, and for allocating the baseband parts to different sectors, and wherein the base station further comprises allocation means controlled by the control means for allocating the timeslots, and wherein the allocation means are arranged to allocate the timeslots to different baseband parts.

12. A method for controlling a base station used in a cellular radio system employing TDMA multiple access techniques and including terminals, sectors and at least one base station which transmits one or more carriers, wherein the base station includes a plurality of baseband parts, and at least one transceiver unit, which is coupled to the rest of the system by a digital transmission line configured to transmit information in the timeslots, the method comprising: allocating the timeslots as required to different carriers, dynamically allocating the baseband parts as required to different sectors, and allocating the baseband parts so that timeslots routed via the same baseband part are transmitted to different sectors.

13. A base station used in a cellular radio system employing TDMA multiple access techniques and including terminals, sectors, a transmission line and at least one base station which transmits one or more carriers, wherein the base station includes a plurality of baseband parts, and least one transmitter-receiver, which is connected to the rest of the system by a digital transmission line configured to transmit information in the timeslots, the base station comprising: control means for allocating the timeslots as required to different carriers, and for allocating the baseband parts to different sectors, and wherein the baseband parts are arranged to be allocated so that timeslots routed via the same baseband part are transmitted to the different sectors.

14. A base station used in a cellular radio system employing TDMA multiple access techniques and including terminals, sectors, a transmission line and at least one base station which transmits one or more carriers, wherein the base station includes a plurality of baseband parts, and least one transmitter-receiver, which is connected to the rest of the system by a digital transmission line configured to transmit information in the timeslots, the base station comprising: control means for allocating the timeslots as required to different carriers, and for allocating the baseband parts to different sectors, and wherein the base station further comprises allocation means controlled by the control means for allocating the timeslots, and wherein the allocation means are arranged to allocate the timeslots to different baseband parts.

* * * * *